(12) United States Patent
Bottomley et al.

(10) Patent No.: US 7,751,463 B2
(45) Date of Patent: Jul. 6, 2010

(54) METHOD AND APPARATUS FOR SUPPRESSING INTERFERENCE BASED ON CHANNELIZATION CODE POWER ESTIMATION WITH BIAS REMOVAL

(75) Inventors: Gregory E. Bottomley, Cary, NC (US); Yi-Pin Eric Wang, Cary, NC (US); Stephen J. Grant, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 815 days.

(21) Appl. No.: 11/566,756

(22) Filed: Dec. 5, 2006

(65) Prior Publication Data

US 2008/0130719 A1 Jun. 5, 2008

(51) Int. Cl.
*H04B 1/00* (2006.01)
(52) U.S. Cl. ...................... 375/142; 375/349
(58) Field of Classification Search ......... 375/142–144, 375/147–150, 349
See application file for complete search history.

(56) References Cited

U.S. PATENT DOCUMENTS

| | | | |
|---|---|---|---|
| 6,373,878 B1 * | 4/2002 | Palenius et al. ............. | 375/136 |
| 6,501,788 B1 | 12/2002 | Wang et al. | |
| 6,801,565 B1 | 10/2004 | Bottomley et al. | |
| 7,180,881 B2 * | 2/2007 | DiFazio ...................... | 370/335 |
| 2004/0017311 A1 | 1/2004 | Thomas et al. | |
| 2004/0030534 A1 | 2/2004 | Thomas et al. | |
| 2004/0052305 A1 | 3/2004 | Olson et al. | |
| 2004/0146093 A1 | 7/2004 | Olson et al. | |
| 2004/0151238 A1 | 8/2004 | Masenten | |
| 2005/0078742 A1 | 4/2005 | Cairns et al. | |
| 2005/0111528 A1 | 5/2005 | Fulghum et al. | |
| 2005/0201447 A1 | 9/2005 | Cairns et al. | |
| 2005/0215218 A1 | 9/2005 | Bottomley et al. | |

(Continued)

FOREIGN PATENT DOCUMENTS

WO 00/44106 7/2000

(Continued)

OTHER PUBLICATIONS

Affes, S. et al. "Interference Subspace Rejection: A Framework for Multiuser Detection in Wideband CDMA." IEEE Journal on Selected Areas in Communications, vol. 20, No. 2, Feb. 2002, pp. 287-302.

(Continued)

*Primary Examiner*—Emmanuel Bayard
(74) *Attorney, Agent, or Firm*—Coats & Bennett, P.L.L.C.

(57) ABSTRACT

Processing in a baseband processor is improved by estimating channelization code powers when processing received signals and reducing at least one of interference and noise power from the code power estimates. According to one embodiment of a wireless communication device such as a mobile phone or Local Area Network (LAN) adapter, the device comprises circuitry configured to receive a composite signal having contributions from a signal of interest and one or more interfering signals and a baseband processor. The baseband processor is configured to estimate channelization code powers for a channelization code associated with the signal of interest and one or more channelization codes associated with the one or more interfering signals. The baseband processor is also configured to reduce at least one of interference and noise power from the channelization code power estimates.

36 Claims, 4 Drawing Sheets

U.S. PATENT DOCUMENTS

| | | | |
|---|---|---|---|
| 2006/0007990 | A1 | 1/2006 | Cozzo et al. |
| 2006/0079221 | A1 | 4/2006 | Grant et al. |
| 2006/0182204 | A1 | 8/2006 | Cairns et al. |
| 2006/0251156 | A1 | 11/2006 | Grant et al. |
| 2006/0268962 | A1 | 11/2006 | Cairns et al. |
| 2007/0104254 | A1 | 5/2007 | Bottomley et al. |
| 2007/0270155 | A1* | 11/2007 | Nelson et al. ............ 455/452.2 |
| 2008/0089395 | A1* | 4/2008 | Cairns ........................ 375/148 |
| 2008/0101443 | A1* | 5/2008 | Lindoff et al. .............. 375/148 |
| 2009/0201905 | A1* | 8/2009 | Kwak et al. ................. 370/342 |

FOREIGN PATENT DOCUMENTS

| | | |
|---|---|---|
| WO | 01/10052 | 2/2001 |
| WO | 2004036811 | 4/2004 |
| WO | 2004036812 | 4/2004 |

OTHER PUBLICATIONS

Ghauri, I. et al. "Blind Channel Identification and Projection Receiver Determination for Multicode and Multirate Situations in DS-CDMA Systems." In Proc. IEEE Intl. Conf. Acoustics, Speech and Sig. Proc. (ICASSP), Salt Lake City, UT, USA, May 7-11, 2005, pp. 2197-2200.

Gupta, M.F. et al. "Successive Interference Cancellation Algorithms for Downlink W-CDMA Communications." IEEE Trasn. Wireless COmmunications, vol. 1, Jan. 2002, pp. 169-177.

Hansen, H. et al. "High Capacity Downlink Transmission with MIMO Interference Subspace Rejection in Multicellular CDMA Networks." EURASIP Journal on Applied Signal Processing, 2004:5, pp. 707-726.

Madkour, Mohamed F. et al. "Successive Interference Cancellation Algorithms for Downlink W-CDMA Communications." IEEE Transactions on Wireless Communications, vol. 1, No. 1, Jan. 2002, pp. 169-177.

Cozzo, C. et al. "DS-CDMA SIR Estimation with Bias Removal." 2005 IEEE Wireless Communications and Networking Conference, vol. 1, Mar. 13-17, 2005, pp. 239-243.

Zhang, Q. T. et al. "A Unified Approach to Multirate Detection for Cellular Systems on Fast-Fading Channels." IEEE Transactions on Wireless Communications, vol. 3, No. 5, Sep. 2004, pp. 1702-1710.

Bottomely, G.E. et al. "Method and apparatus for Resource Reuse in a Communication System." Co-pending U.S. Appl. No. 11/681,302, filed Mar. 2, 2007.

Cairns, D. A. et al. "Robust Multicode Detector for HSDPA." Co-pending U.S. Appl. No. 11/739,126, filed Apr. 24, 2007.

Bottomley, G. E. et al. "Method and Apparatus for Code Power Estimation for Received Signal Processing." Co-pending U.S. Appl. No. 11/935,840, filed Nov. 7, 2007.

Wang, Y-P. E. et al. "Efficient Computation of a Waveform Correlation Matrix." Co-pending U.S. Appl. No. 11/739,924, filed Apr. 25, 2007.

Co-pending U.S. Appl. No. 11/681,302, filed Mar. 2, 2007.
Co-pending U.S. Appl. No. 11/739,126, filed Apr. 24, 2007.
Co-pending U.S. Appl. No. 11/739,924, filed Apr. 25, 2007.
Co-pending U.S. Appl. No. 11/935,840, filed Nov. 7, 2007.

* cited by examiner

|  | DESIRED RAKE FINGER 1 | DESIRED RAKE FINGER 2 | INTERFERING RAKE FINGER |
|---|---|---|---|
| DESIRED RAKE FINGER 1 | AVERAGED TERM | AVERAGED TERM | CODE-SPECIFIC TERM |
| DESIRED RAKE FINGER 2 | AVERAGED TERM | AVERAGED TERM | CODE-SPECIFIC TERM |
| INTERFERING RAKE FINGER | CODE-SPECIFIC TERM | CODE-SPECIFIC TERM | CODE-SPECIFIC TERM |

*FIG. 4*

METHOD AND APPARATUS FOR SUPPRESSING INTERFERENCE BASED ON CHANNELIZATION CODE POWER ESTIMATION WITH BIAS REMOVAL

BACKGROUND

The present invention generally relates to wireless communication devices, and particularly relates to suppressing interference from a received signal using channelization code power estimates.

Direct Sequence Code Division Multiple Access (DS-CDMA) systems use two different codes for separating devices and/or channels when transmitting data. Scrambling codes are pseudo-noise sequences used to separate base stations, cells or sectors from each other in the downlink. In the uplink, scrambling codes separate users. Channelization codes are orthogonal sequences used to separate different channels in a particular cell or sector in the downlink or to separate different parallel streams of data intended for one user in either the uplink or downlink. As such, channelization codes channelize user-specific data onto respective channels and scrambling codes scramble the channelized data. Power allocated to each channelization code typically differs and depends on channel conditions. For example, channelization code power may be reduced for those channels having good signal transmission characteristics and increased for those channels having poor signal transmission characteristics. Alternatively, more radio resources may be allocated to high quality channels and less to low quality channels.

Multipath fading causes loss of orthogonality between different channelization codes, thus causing signal interference. This interference can be self-interference (e.g. between codes assigned to the same user) as well as inter-user-interference. Signal interference limits performance in DS-CDMA systems such as Wideband-CDMA (W-CDMA), High Speed Downlink Packet Access (HSDPA), CDMA2000 and 1XEV-DO systems. Particularly, capacity and high data-rate coverage are adversely affected. Signal interference may be self-induced where other desired symbols sent in parallel (multicode) or in series (previous, next symbols) interfere with a symbol of interest. Other-user symbols also cause interference and may be sent from the same base station (own-cell interference) or from a different base station (other-cell interference).

Conventional wireless receivers account for impairment (interference and noise) correlations between interfering signals and a signal of interest when processing a received signal. Accounting for impairment correlations enables a receiver to better suppress interference from a received signal, thus improving performance. For example, in a Generalized RAKE (G-RAKE) receiver, some signal processing "fingers" are placed on signal path delays of a multipath fading channel for optimizing signal energy collection while other fingers are placed off signal path delays to suppress interference. Finger outputs are combined to form symbol estimates by weighting each component based on impairment correlations.

That is, G-RAKE receivers suppress interference by optimally combining components of a received signal based on impairment correlations. The combining weights may also be used to estimate received signal quality, e.g., by calculating a Signal-to-Interference-plus-Noise Ratio (SINR). SINR information is provided to the corresponding base station for use in optimizing radio resources, e.g., by adjusting the power allocated to different channelization codes.

G-RAKE combining weights and SINR estimates are conventionally derived from channel response and impairment correlation estimates. Channel response and impairment correlation estimates are ascertained at least in part from demodulated and despread pilot symbols transmitted over a common channel. During the impairment correlation estimation process, interference and noise powers are conventionally estimated by fitting interference and noise correlation terms to a pilot symbol-based measured impairment. The model fitting parameter associated with the interference correlation term approximates total base station, not individual channelization code powers. As such, conventional combining weights and SINR estimates are based on total base station power approximations, not channel-specific power estimates.

SUMMARY

According to the methods and apparatus taught herein, estimation of channelization code powers is performed using a received signal, the received signal having various signal components. One component of the received signal corresponds to a signal of interest transmitted using a first channelization code. The remaining components correspond to one or more interfering signals transmitted using additional channelization codes. The received composite signal is down-converted to a baseband signal. The baseband signal is then processed using a channelization-code based impairment correlation model which enables the recovery of the desired signal component while suppressing interference associated with the interfering signal components. The impairment correlation model is derived based on channelization code power estimates.

Interference and/or noise power contributions are accounted for when estimating code powers. For example, when estimating power allocated to a channelization code of interest using RAKE combined values, power from other codes may "leak" into the code power estimate since interference is present in RAKE combined values. Such interference power leakage is reduced when estimating channelization code powers. Likewise, noise power such as thermal noise or un-modeled interference may also be reduced during the code power estimation process. As such, a more accurate understanding of channel power allocation is developed.

According to one embodiment of a wireless communication device such as a mobile phone or Local Area Network (LAN) adapter, the device comprises circuitry configured to receive a composite signal having contributions from a signal of interest and one or more interfering signals. The device also comprises a baseband processor. The baseband processor is configured to estimate channelization code powers for a channelization code associated with the signal of interest and one or more channelization codes associated with the one or more interfering signals. The baseband processor is also configured to reduce at least one of interference and noise power from the channelization code power estimates. Channelization code power estimates may be derived in a variety of ways, e.g., in accordance with a single or multi-stage model fitting process or based on measured channelization code power levels. Channelization code power estimates may be derived from pilot signals, data signals, or a combination of both.

Of course, the present invention is not limited to the above features and advantages. Those skilled in the art will recognize additional features and advantages upon reading the following detailed description, and upon viewing the accompanying drawings.

BRIEF DESCRIPTION OF THE DRAWINGS

FIG. 4 illustrates an exemplary impairment correlation matrix having channelization code-specific terms and non-code specific terms.

DETAILED DESCRIPTION

Figure 1:
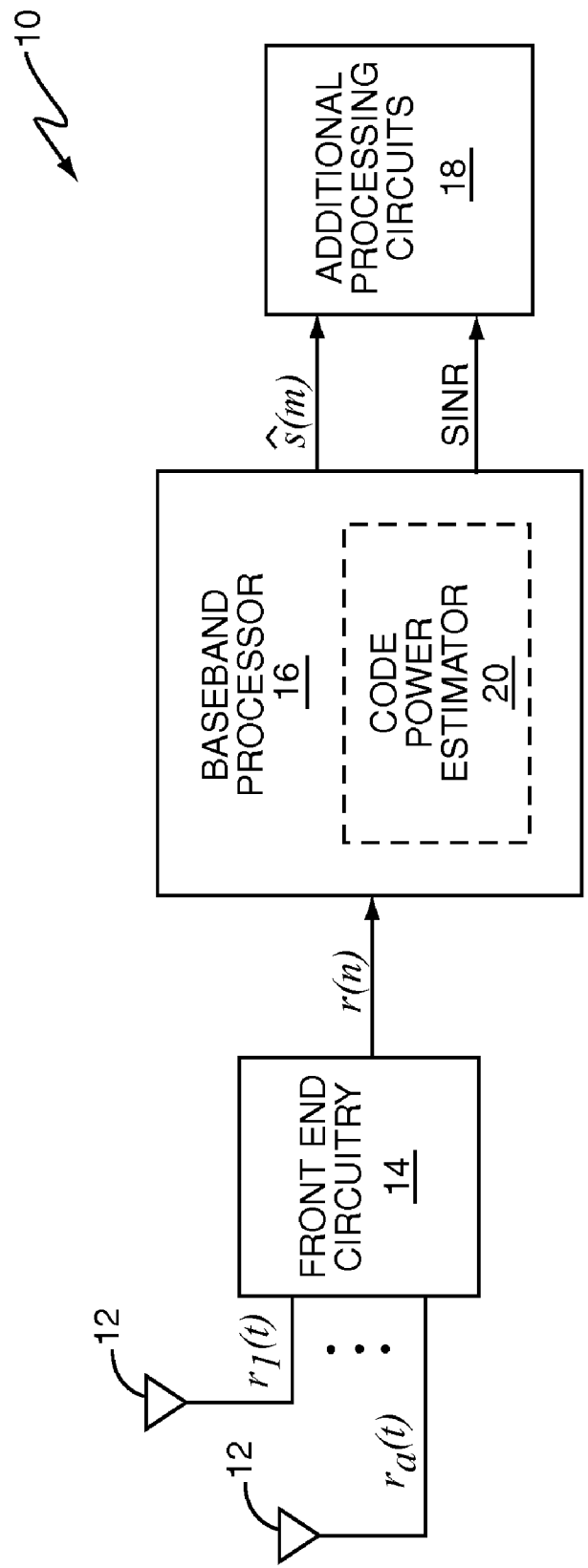
FIG. 1 is a block diagram of one embodiment of a wireless communication device having a baseband processor that estimates channelization code power.

FIG. 1 illustrates an embodiment of a wireless communication device 10 such as a mobile phone or a wireless Local Area Network (LAN) adapter. The device 10 receives and processes signals transmitted in conformance with a DS-CDMA multiplexing scheme such as W-CDMA, HSDPA, CDMA2000, 1XEV-DO, etc. The device 10 comprises one or more antennas 12, frond end circuitry 14, a baseband processor 16 and additional processing circuits 18. Each antenna 12 receives a composite signal $r_\alpha(t)$ that includes various signal components segregated by different channelization codes. For example, a given transmitter transmits a plurality of control and information signals in the composite signal, using a set of orthogonal channelization codes to separate each signal. In theory, such channelization allows the corresponding channelization code to be used at a receiver to extract any signal of interest from the received composite signal, free of interference from the other signals. However, multipath fading at least partially spoils channelization code orthogonality, resulting in at least some interference from the other signals.

As taught herein, consideration of the channelization code transmit power allocations improves received signal interference suppression at the device 10. More particularly, the front end circuitry 14 such as one or more amplifiers, filters, mixers, digitizers, etc. converts the received composite signal to a baseband signal r(n). The baseband processor 16 develops an impairment or data correlation estimate based on channelization code power estimates derived by a code power estimator 20 included in or associated with the baseband processor 16. The baseband processor 16 uses the channelization code-specific correlation estimate to suppress signal interference when processing baseband signals derived from the composite received signal. The additional processing circuits analyze soft bit values (sbv), e.g., by performing error correction.

In one embodiment, the baseband processor 16 functions as a multi-symbol RAKE (M-RAKE) receiver while in another embodiment the baseband processor 16 functions as a multi-code linear equalizer (MC-LEQ), e.g., in accordance with the M-RAKE and MC-LEQ teachings of U.S. patent application Ser. No. 10/720,492, filed Nov. 24, 2003, which is incorporated herein by reference in its entirety. Regardless of baseband configuration, an impairment or data correlation estimate is formulated based on channelization code power estimates instead of a total base station power estimate. Further, interference and/or noise power contributions are accounted for when estimating code powers. For example, when estimating code powers using RAKE combined values, power leakage between channelization codes is reduced. Likewise, noise power such as thermal noise or un-modeled interference may also be reduced during the code power estimation process.

Accordingly, correlation terms are based on a more accurate understanding of channel power allocation, thus improving performance of the baseband processor 16. For ease of description only, baseband signal processing is next described with reference to impairment (interference plus noise) correlations. However, the model equally applies to data correlations, and thus, data correlations are within the scope of the various embodiments disclosed herein.

While the invention is next described with respect to M-Rake and MC-LEQ receivers, estimated code powers can be used by other receiver types. For example, linear minimum-mean square error (MMSE) multi-user detection can be performed using a matrix that depends on code powers. In S. Verdu, *Multiuser Detection*, Cambridge University Press, p. 294, equation 6.28 shows that bits can be estimated using a matrix A raised to the −2 power. The matrix A corresponds to a diagonal matrix of code amplitudes. Raising this matrix to the −2 power gives a diagonal matrix whose elements are the reciprocals of code powers. In practice, these code powers could be estimated and used in equation 6.28 to estimate symbols.

Figure 2:
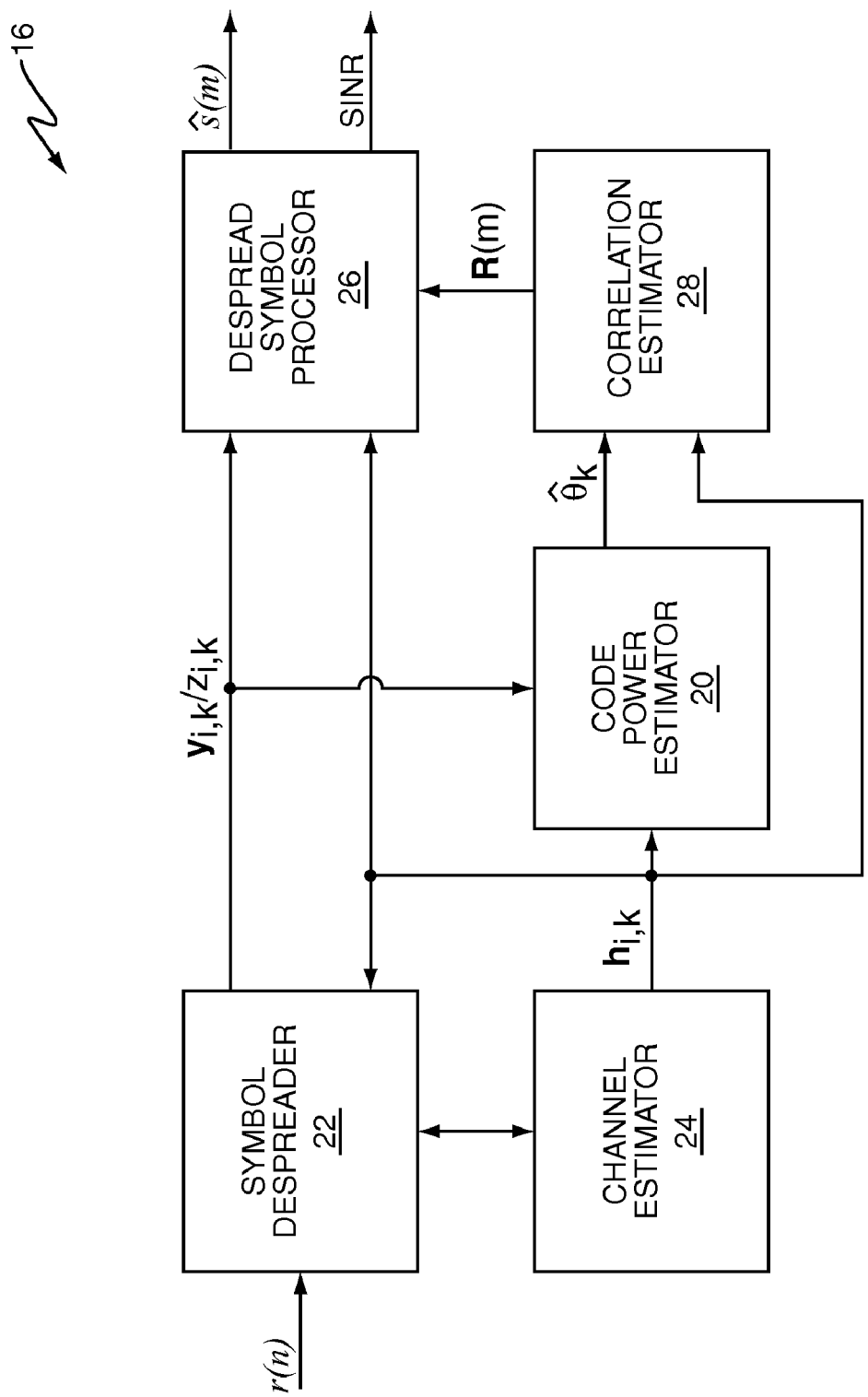
FIG. 2 is a block diagram of one embodiment of the baseband processor included in the wireless communication device of FIG. 1.

With this in mind, FIG. 2 illustrates one embodiment of the baseband processor 16. A symbol despreader 22 demodulates and despreads a baseband signal r(n). The baseband signal comprises various signal components separated by different channelization codes as previously described. One component corresponds to a symbol of interest while the remaining components correspond to interfering symbols. The interfering symbols may be other desired symbols sent in parallel (multicode) or in series (previous, next symbols) that interfere with the symbol of interest or other-user symbols (own-cell and/or other cell). The channelization codes associated with the symbol of interest and interfering symbols may have different power levels. The baseband processor 16 estimates the different channelization code power levels while accounting for interference and/or noise power contributions. The baseband processor 16 then uses the code power estimates to improve received signal processing.

Figure 3:
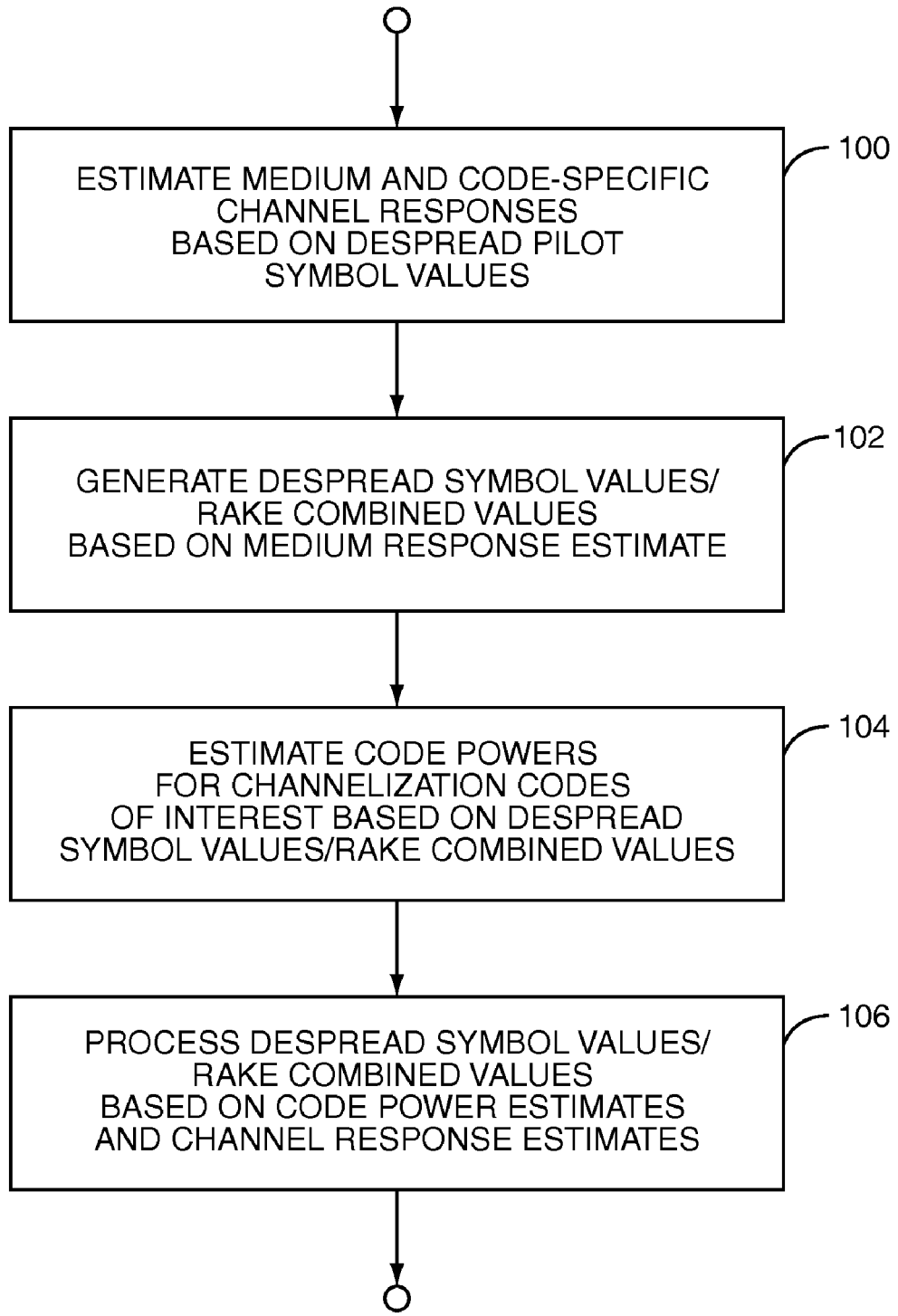
FIG. 3 illustrates one embodiment of processing logic for processing received signals based on channelization code power estimates.

In more detail, a channel estimator 24 generates a common medium response estimate $g_i$ and a code-specific channel response estimate $h_{i,k}$ for the $k^{th}$ channelization code at the $i^{th}$ symbol period based on despread pilot symbols provided by the symbol despreader 22 and spreading codes as is well understood in the art, e.g., as illustrated by Step 100 of FIG. 3. The symbol despreader 22 despreads received symbols and may or may not RAKE combine them based on the medium response estimate, e.g., as illustrated by Step 102 of FIG. 3. Particularly, if the baseband processor 16 is configured as an M-RAKE receiver, the symbol despreader 22 yields despread symbol values y as given by:

$$y = \sum_{j=1}^{M} \sum_{k=1}^{K} \sqrt{\theta_{j,k}} \sum_i h_{i,k} s(i,k) + n \qquad (1)$$

where j denotes base station, $\theta_k$ denotes the channelization code power (e.g., energy-per-symbol) for the $k^{th}$ channelization code, s(i,k) denotes the modem symbol value for the $k^{th}$ code at the $i^{th}$ symbol period, and n denotes noise. Similarly, if the baseband processor 16 is configured as an MC-LEQ, the symbol despreader 22 yields RAKE combined values z as given by:

$$z = \sum_{j=1}^{M} \sum_{k=1}^{K} \sqrt{\theta_{j,k}} \sum_{i} h'_{i,k} s(i,k) + n' \qquad (2)$$

where z is a vector of RAKE outputs from different symbol periods and different channelization codes. For ease of description only, one transmitter is considered so that the summation over j becomes one term and index j is omitted. However, those skilled in the art will readily recognize that multiple transmitters may also be considered, and thus, is within the scope of the present invention.

A despread symbol processor 26 yields soft symbol estimates ŝ(m) or received signal quality estimates (e.g., SINRs) by appropriately weighting and combining either despread symbol values or RAKE combined values where m refers to a particular symbol being despread. Despread symbol values and RAKE combined values are weighted based on an impairment correlation matrix R(m) and the code-specific channel response estimate $h_{i,k}$. A correlation estimator 28 generates the impairment correlation matrix R(m). The matrix has code-specific impairment terms scaled by corresponding channelization code power estimates $\hat{\theta}_k$ derived by the code power estimator 20. When the baseband processor 16 functions as an M-RAKE receiver, the correlation estimator 28 generates the code-specific impairment matrix as given by:

$$R(m) = \sum_{k=1}^{K} \hat{\theta}_k \left( \sum_{i,i\neq i(m) \text{ if } k=k(m)} h_{i,k} h_{i,k}^{H} \right) + \beta R_n \qquad (3)$$
$$= \sum_{k=1}^{K} \hat{\theta}_k R_{k,m} + \beta R_n$$

where $R_n$ is a noise correlation matrix which can be estimated from the channel response estimate and receiver pulse shape information. Similarly, when the baseband processor 16 functions as an MC-LEQ receiver, the correlation estimator 28 generates the code-specific impairment matrix as given by:

$$R'(m) = \sum_{k=1}^{K} \hat{\theta}_k \left( \sum_{i,i\neq i(m) \text{if} k=k(m)} h'_{i,k} h'^{H}_{i,k} \right) + \beta R_{n'} \qquad (4)$$
$$= \sum_{k=1}^{K} \hat{\theta}_k R'_{k,m} + \beta R_{n'}$$

In either case, the double summation in equations (3) and (4) excludes the symbol of interest. As such, only signal contributions from interfering symbols are characterized. As seen from equations (3) and (4), code-specific impairment correlations may be expressed as a sum of code power fitting parameters and model terms, where there is a code-specific structured impairment correlation element $R_{k,m}$ for each channelization code estimate $\hat{\theta}_k$ of interest.

Actual code power for each channelization code is related to $$\frac{E_c}{I_{or}}$$

which is a ratio between the power allocated to the channelization code and the total transmit power. The code power estimator 20 estimates normalized channelization code power levels (normalized by the energy in the pilot symbols) using despread symbol values or RAKE combined values while accounting for interference and/or noise power contributions, e.g., as illustrated by Step 104 of FIG. 3. After determining the code power estimates $\hat{\theta}_k$, they are used to calculate an impairment correlation matrix, e.g., in accordance with equation (3) or (4).

In a first embodiment, the code power estimator 20 generates channelization code power estimates by jointly fitting the code-specific structured impairment correlation terms $R_{k,m}$ and noise correlation terms $R_n$ to a measured impairment correlation. The measured impairment correlation represents a measure of all code powers lumped together plus noise power. When the baseband processor 16 functions as an M-RAKE receiver, measured impairment correlation is given by:

$$R_{u,meas} \approx \sum_{k=1}^{K} \hat{\theta}_k R_{k,m} + \beta R_n \qquad (5)$$

where β is a noise power estimate and $R_{u,meas}$ is the measured impairment covariance derived from a pilot signal over one symbol period, e.g., the outer product of an impairment vector. When the baseband processor 16 functions as an MC-LEQ, measured impairment correlation is given by:

$$R_{u',meas} \approx \sum_{k=1}^{K} \hat{\theta}_k R'_{k,m} + \beta R_{n'} \qquad (6)$$

where $R_{u',meas}$ is based on RAKE combined pilot symbol values instead of despread pilot symbol values.

Either way, signal impairment may be measured using pilot signals in accordance with any conventional technique, e.g., in accordance with the teachings of U.S. patent application Ser. No. 11/538,074, filed Oct. 3, 2006, which is incorporated herein by reference in its entirety. Regardless, the expressions in equations (5) and (6) have a code power model fitting term $\hat{\theta}_k$ for each channelization code of interest rather than a single power compensation term for a particular interfering base station. Signal impairment is measured over multiple symbol periods and collected. The code power model fitting terms are then jointly solved by least-squares fitting the collection of measured signal impairments. The joint fitting process accounts at least for noise power contribution, e.g., by including $\beta R_n$ in the fitting process, thus yielding a more accurate estimate of channelization code power allocation. The code power estimates $\hat{\theta}_k$ are provided to the correlation estimator 28 for use in generating an impairment correlation matrix, e.g., in accordance with equation (3) or (4).

In a second embodiment, the code power estimator 20 generates channelization code power estimates using a two-stage fitting process. During the first stage, a conventional fitting process is employed whereby a noise power estimate β and a total transmitter (base station in the downlink) power estimate α for a transmitter of interest are given by:

$$R = \alpha R_I + \beta R_N \quad (7)$$

where $R_I$ is an interference correlation matrix and $R_N$ is a noise correlation matrix. Additional terms can be used to model multiple transmitters. After generating conventional noise and total base station power estimates, the code power estimator 20 employs a least-squares fitting process that estimates the fraction of α assigned to different ones of the channelization codes. When the baseband processor 16 functions as an M-RAKE receiver, the second fitting stage is given by:

$$R_{u,meas} \approx \alpha \sum_{k=1}^{K} \theta_k R_{k,m} + \beta R_n \quad (8)$$

Similarly, when the baseband processor 16 functions as an MC-LEQ, the second fitting stage is given by:

$$R_{u',meas} \approx \alpha \sum_{k=1}^{K} \theta_k R'_{k,m} + \beta R_{n'} \quad (9)$$

Like the first embodiment, the second stage of the fitting process accounts at least for noise power contribution, e.g., by including $\beta R_n$ in the fitting process, thus yielding a more accurate estimate of channelization code power allocation. The correlation estimator 28 again uses the channelization code power estimates $\hat{\theta}_k$ to generate an impairment correlation matrix, e.g., in accordance with equation (3) or (4).

In a third embodiment, the code power estimator 20 uses either despread symbol values or RAKE combined values to estimate power levels for channelization codes of interest. For ease of description only, the third embodiment is described next with reference to RAKE combined values. Like the second embodiment, the first stage of the code power estimation process yields a normalized total base station power estimate α and a noise power estimate β. The base station power estimate may be normalized by the energy-per-symbol of pilot symbols. In the second stage of the code power estimation process, despread values corresponding to different CDMA code channels are formed and Rake combined. Both pilot and data channels may be used. Also, the channelization codes considered do not have to correspond to physically allocated CDMA channels. Instead, the channelization codes considered may correspond to "virtual" channels as well, e.g., virtual channels based on the High Speed Downlink Packet Access (HSDPA) protocol where sixteen channelization codes of length sixteen may be used.

An average symbol power estimate is generated next, e.g., by taking the magnitude-square of the Rake-combined values and averaging them over multiple symbol periods. Thus, for base station i and channelization code k, the corresponding Rake-combined value is given by:

$$z_{i,k}(j) = g_i^H y_{i,k}(j) \quad (10)$$

and the average symbol power (or energy) estimate is given by:

$$P_{i,k} = \frac{1}{J} \sum_{j=1}^{J} |z_{i,k}(j)|^2 \quad (11)$$

where j is a time (symbol period) index, $g_i$ is the medium response estimate associated with base station i, and $y_{i,k}$ is a vector of despread values associated with base station i and code k. The non-code specific medium and net response estimates g and h are related, e.g., as discussed in U.S. patent application Ser. No. 10/800,167 filed Mar. 12, 2004, the contents of which are incorporated herein by reference in their entirety. In some instances, net response estimates may be used as medium response estimates. Further, other combining weights such as G-Rake weights may be used.

Regardless, code power measurements, e.g., normalized code power estimates, normalized by the energy-per-symbol in the pilot symbols, are obtained by scaling the average symbol estimate powers to account for the effects of Rake combining using medium response estimates. The code power measurements are given by:

$$M_{i,k} = F_i P_{i,k} \quad (12)$$

where the scaling factor $F_i$ is given by:

$$F_i = \frac{1}{|\bar{h}_i|^2 |g_i|^2} \quad (13)$$

and $\bar{h}_i$ is the net response estimate associated with code k (non-code specific).

The code power measurement is normalized, similar to the total base station power estimate α from the first stage. Optionally, $F_i$ can be normalized by the spreading factor of the data. Code power measurements may be used as final code power estimates as given by:

$$\theta_{i,k} = M_{i,k} \quad (14)$$

If code power measurements are used as final estimates, interference and noise power contributions distort the code power estimates, particularly when using Rake combined values.

The adverse effects associated with noise power on the code power estimates may be reduced, e.g., by subtracting a noise bias term from the code power estimates. In one embodiment, the noise power estimate β generated during the first stage of the code power estimation process is removed from the code power estimates as given by:

$$\theta_{i,k} = F_i P_{i,k} - F_i \beta g_i^H R_n g_i = F_i (P_{i,k} - \beta g_i^H R_n g_i) \quad (15)$$

where $R_n$ is a normalized white noise covariance. If the path delays are chip-spaced or approximated as such, then noise bias can be removed from the code power estimates as given by:

$$\theta_{i,k} = F_i P_{i,k} - F_i \beta |g_i|^2 = F_i (P_{i,k} - \beta |g_i|^2) \quad (16)$$

or $$\theta_{i,k} = F_i P_{i,k} - U_i \beta \quad (17)$$

where $$U_i = \frac{1}{|\tilde{h}_i|^2} \quad (18)$$

The adverse effects associated with interference power on the code power estimates may also be reduced, e.g., by subtracting an interference bias term from the code power estimates or by solving for improved estimates using the initial estimates given by equation (14). Power from other codes leaks into the code power estimate when Rake-combined values are used, thus resulting in an undesired interference power contribution in the code power estimates. In one embodiment, interference power contribution is reduced from the code power estimates by subtracting the normalized total base station power estimate α generated during the first stage of the code estimation process from the code power estimates as given by:

$$\theta_{i,k} = F_i \left( P_{i,k} - \sum_m \alpha_m g_i^H R_{I,i,m}(g_m) g_i \right) \quad (19)$$

where $R_{I,i,m}(g_m)$ is the normalized interference covariance associated with data sent from base station i but interfered from base station m. Also, $\alpha_m$ is the normalized total base station power associated with base station m. The interference covariance matrices are computed differently for own-cell (m=i) and other-cell (m≠i) interference. Alternatively, noise and interference power contributions may be jointly subtracted from the code power estimates as given by:

$$\theta_{i,k} = F_i \left( P_{i,k} - \beta g_i^H R_n g_i - \sum_m \alpha_m g_i^H R_{I,i,m}(g_m) g_i \right) \quad (20)$$

In another embodiment, interference power contribution is reduced from the code power estimates by computing refined code power estimates from initial estimates obtained after noise power contribution has been removed. According to this embodiment, initial code power estimates $\theta_{i,k}$ are generated, e.g., as given by equation (14), (15), (16), or (17). Refined code power estimates are then derived from the initial estimates as given by:

$$\tilde{\theta}_{i,k} = \theta_{i,k} - V_{i,k} Q_{i,k} \quad (21)$$

$$V_{i,k} = \sum_m A_{i,k,m} \sum_j \theta_{m,j} \text{ where} \quad (22)$$

$$Q_{i,k} = \frac{1}{1 + \sum_m K_m A_{i,k,m}} \quad (23)$$

$$A_{i,k,m} = F_i g_i^H R_{I,i,m}(g_m) g_i = F_i I_{i,m} \quad (24)$$

$$I_{i,m} = g_i^H R_{I,i,m}(g_m) g_i \quad (25)$$

and $K_m$ is the number of channelization codes modeled for base station m. Note that $I_{i,m}$ can be interpreted as the interference power present on the Rake-combined values due to interfering signals transmitted from base station m. The subtraction in equation (21) is similar to subtracting a bias, except that the bias term depends on the initial code power estimates. Further, the subtraction in equation (21) also depends on scaled interference power estimates ($A_{i,k,m}$).

If the same spreading factor is assumed for all users (or virtual users) modeled, then $F_i$ and hence $A_{i,k,m}$ no longer depend on code index k. Under this scenario, $V_{i,k}$ and $Q_{i,k}$ are given by:

$$V_{i,k} = V_i = \sum_m A_{i,m} \sum_j \theta_{m,j} \quad (26)$$

$$Q_{i,k} = Q_i = \frac{1}{1 + \sum_m K_m A_{i,m}} \quad (27)$$

In a fourth embodiment of computing channelization code power estimates, the step of measuring impairment correlations may be skipped if the received signal comprises mostly known symbols, e.g., the received signal comprises a block of pilot symbols. Under this scenario, channel code power estimates may be derived by applying least-squares fitting directly to despread symbol values as given by equation (3) or (4). The despread values can correspond to both pilot and data symbols.

In certain situations, several channelization codes are allocated the same power. For example, in HSDPA, multiple codes assigned to the same user are allocated the same power. If the receiver corresponds to an HSDPA user, it knows this for the codes allocated to that user. In general, the receiver can know or detect that codes are allocated the same power level and utilize this knowledge during the code power estimation process. For the embodiments described herein that include a fitting process, fewer fitting parameters may be used. For the embodiments described herein that include measuring code powers with despread or Rake-combined values, results for different codes with the same power may be averaged. Alternatively, fewer measurements may be made, i.e., some channelization codes may be skipped during the estimation process.

After the channelization code powers have been estimated, a code-specific impairment correlation matrix R(m) may be determined based on the code power estimates, e.g., in accordance with equation (3) or (4). Despread symbol values or RAKE combined values are then processed by the baseband processor 16 using the code-specific impairment correlation matrix and channel response estimates, e.g., as illustrated by Step 106 of FIG. 3. In more detail, the despread symbol processor 26 generates soft symbol estimates $\hat{s}(m)$, received signal quality estimates such as SINRs, or both. When the baseband processor 16 functions as an M-RAKE receiver, the despread symbol processor 26 generates despread symbol combing weights w as given by:

$$w_m = R^{-1}(m) h_{i(m),k(m),m} \quad (28)$$

The despread symbol processor 26 combines different despread symbols $y_{i,k}$ using the combining weights to form soft symbol estimates. The despread symbol processor 26 also uses the combining weights to generate SINRs as given by:

$$SINR = h_{i(m),k(m),m}^H R^{-1}(m) h_{i(m),k(m),m} = w_m^H h_{i(m),k(m),m} \quad (29)$$

Similarly, when the baseband processor 16 functions as an MC-LEQ, the despread symbol processor 26 generates combing weights w' as given by:

$$w_m' = R'^{-1}(m) h'_{i(m),k(m),m} \quad (30)$$

The despread symbol processor 26 combines different RAKE combined values $z_{i,k}$ using the combining weights to form soft symbol estimates. The despread symbol processor 26 also uses the combining weights to generate SINRs as given by:

$$SINR_{(m),m} = h'^H_{i(m),k(m),m} R'^{-1}((m)h'_{i(m),h(m),m} = w'^H_m h'_{i(m),k} \qquad (31)$$

In either case, SINR values may be calculated assuming different code scrambling subsequences, not necessarily the ones in current use. The multiple SINR values can then be averaged. For M-Rake and MC-LEQ receivers, the SINR expressions in (29) and (31) may be used for either power control or rate adaptation. With power control, the SINR is compared to a threshold to determine whether more or less power on that code is needed. A corresponding power control command is then issued. For rate adaptation, the SINR is used to determine what data rate or bearer should be used in a future transmission.

While the embodiments previously disclosed broadly relate to developing a channelization-code specific impairment or data correlation estimate based on code power estimates and using the code-specific model to suppress signal interference when processing baseband signals, various modifications are next explained. These modifications apply equally to the embodiments previously disclosed unless stated otherwise.

In a first modification, not all interfering symbols are suppressed using channelization code knowledge. For example, to maintain receiver complexity at an acceptable level, only dominant interfering symbols are suppressed using code knowledge. The remaining interfering symbols may be treated as colored noise, e.g., by using conventional M-RAKE or MC-LEQ techniques. Channelization codes used by other-cell base stations may be provided to the wireless communication device 10. Otherwise, the wireless device 10 may detect channelization codes associated with other-cell base stations. In one case, the baseband processor 16 searches for Orthogonal Variable Spreading Factor (OVSF) codes in use. In another case, the baseband processor 16 compares a threshold with the magnitude-square of interfering despread symbol values to identify active codes. Alternatively, the baseband processor 16 assumes a set of OVSF codes are all active. Code power estimates are then used to identify which codes are active and which ones are not.

Regardless, in a non-limiting example, consider a received signal that is dominated by two base station signals: a desired (own-cell) base station and an interfering (other-cell) base station. An impairment matrix averaged over the channelization codes may be formed as given by:

$$i \hat{R} = \hat{\theta}_1 R_1 + \alpha R_I + \beta R_N \gamma R_O + \hat{\theta}_2 R_2 \qquad (32)$$

where the interfering signals are divided into separate groups. Some groups are addressed with code-specific information while others are not. In the present example, two interfering symbols are suppressed—one from each base station. As such, the term $\hat{\theta}_1 R_1$ in equation (32) corresponds to the interfering symbol of interest transmitted by the own-cell base station, where $\hat{\theta}_1$ represents the channelization code power estimate associated with the symbol and $R_1$ is the corresponding structured impairment term. Likewise, the term $\hat{\theta}_2 R_2$ in equation (32) corresponds to the interfering symbol of interest transmitted by the other-cell base station.

The code specific fitting parameters ($\hat{\theta}_1$ and $\hat{\theta}_2$) and non-code specific fitting parameters ($\alpha$, $\beta$ and $\gamma$) may be jointly estimated using a measured impairment correlation matrix obtained from embedded pilot symbols, e.g., in accordance with the first embodiment previously disclosed (equation 5 or 6). However, in the present example, code power estimates associated with two different base stations are fitted to the measured impairment correlation matrix. Also, the fitting parameter $\alpha$ represents the total power associated with the own-cell base station minus the code power associated with the first interfering symbol of interest. Likewise, $\gamma$ represents the total power associated with the other-cell base station minus the code power associated with the other interfering symbol of interest. Alternatively, the expression in equation (32) may be expressed as:

$$\hat{R} = \hat{\theta}_1 R_1 + (\alpha - \hat{\theta}_1) R_I + \beta R_N + (\gamma - \hat{\theta}_2) R_O + \hat{\theta}_2 R_2 \qquad (33)$$

where $\alpha$ and $\gamma$ now correspond to the total own-cell and other-cell base station powers, respectively. In either case, the fitting parameters may be determined using least-squares fitting.

Alternatively, the fitting parameters may be estimated using a two-stage approach, e.g., in accordance with the second embodiment previously disclosed (equation 8 or 9). In a first stage, common pilot channel symbols are used to estimate $\alpha$, $\beta$ and $\gamma$ as given by:

$$\hat{R} = \alpha R_I + \beta R_N + \gamma R_O \qquad (34)$$

In a second stage, the channelization code power parameters $\hat{\theta}_1$ and $\hat{\theta}_2$ are jointly determined in accordance with either equation (32) or (33). Alternatively, the channelization code power parameters may be estimated separately as given by:

$$\hat{R}_1 = \hat{\theta}_1 R_1 + (\alpha - \hat{\theta}_1) R_I + \beta R_N + \gamma R_O \qquad (35)$$

and $$\hat{R}_2 = \alpha R_I + \beta R_N + (\gamma - \hat{\theta}_2) R_O + \hat{\theta}_2 R_2 \qquad (36)$$

Computational processing is reduced by estimating the fitting parameters using a two-stage process since the order of matrix calculations in a two-stage process is lower.

Optionally, power from an interfering symbol of interest may be separated out from total base station power using multiplication instead of addition or subtraction. For example, model fitting parameters may be jointly determined as given by:

$$\begin{aligned}\hat{R} &= \hat{\theta}_1 \alpha R_1 + (1 - \hat{\theta}_1)\alpha R_I + \beta R_N + \gamma(1 - \hat{\theta}_2) R_O + \hat{\theta}_2 \gamma R_2 \\ &= \lambda_1 R_1 + \lambda_2 R_I + \beta R_N + \lambda_3 R_O + \lambda_4 R_2\end{aligned} \qquad (37)$$

The $\lambda$s and $\beta$ may be estimated using least-squares fitting. Then, the $\theta$'s, $\alpha$ and $\gamma$ may be determined from the $\lambda$s.

In a second modification, data symbols are used to estimate the various fitting parameters discussed herein. According to this embodiment, embedded pilot symbols are treated as data symbols. Alternatively, some fitting equations may be generated by subtracting a received signal from pilot symbol estimates. Regardless, the embodiments previously disclosed herein may be extended to include the use of data symbols by adding an additional model term representing that the data signal has not been removed from the fitting analysis. For example, equation (6) becomes:

$$R_{d,meas} \approx \sum_{k=1}^{K} \hat{\theta}_k R_{k,m} + \beta R_n + \hat{\theta}_m R_m \quad (38)$$

where $\hat{\theta}_m R_m$ represents the presence of a data signal in the fitting process. In another example, equation (33) becomes:

$$\hat{R} = \hat{\theta}_1 R_1 + (\alpha - \hat{\theta}_1) R_1 + \beta R_N + (\gamma - \hat{\theta}_2) R_O + \hat{\theta}_2 R_2 + \hat{\theta}_0 R_0 \quad (39)$$

In a third modification, one or more channelization code power estimates are averaged over multiple symbol periods. In one embodiment, the channelization code power associated with an interfering user having an average channel response estimate different than other users from the same base station is averaged over multiple symbol periods. This may occur if the base station of interest employs user-specific transmit beamforming or if the interfering user receives transmissions using closed-loop transmit diversity.

In a fourth modification, not all terms in the impairment correlation matrix R(m) are channelization-code specific. For example, in an M-RAKE context, it is more desirable to determine how an interfering symbol finger correlates to desired symbol fingers than how desired symbol fingers correlate with each other. By appropriately arranging the impairment correlation matrix, interfering finger symbol correlations may be arranged along the last row(s) and column(s) of the matrix as illustrated in FIG. 4. In FIG. 4, the last row and column of the impairment matrix contain code-specific terms relating to correlations between an interfering RAKE finger and two desired RAKE fingers. The other terms are averaged over random scrambling sequences since they relate to desired finger correlations. Thus, the only code-specific quantities are located in the last row and last column of the impairment matrix. Generally, it is reasonable to approximate correlations between despread values of the same symbol as well as despread or pre-combined values of different interfering symbols using average terms instead of code-specific terms.

In a fifth modification, the impairment correlation matrix R(m) is estimated using both parametric and non-parametric approaches. In one embodiment, the baseband processor 16 includes both parametric and non-parametric impairment correlation estimators (both not shown), e.g., of the kind described in U.S. patent application Ser. No. 10/811,699, filed Mar. 29, 2004, which is incorporated herein by reference in its entirety. The parametric estimator tracks rapid variations in modeled interference while the non-parametric estimator smoothes correlation measurements over a period of time. As such, parametric and non-parametric correlation matrices may be determined, each having code-specific terms corresponding to channelization codes of interest.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. In a wireless receiver, a method of processing a received composite signal having contributions from a signal of interest and one or more interfering signals comprising:
   estimating channelization code powers at the wireless receiver for a channelization code associated with the signal of interest and one or more channelization codes associated with the one or more interfering signals by determining an impairment correlation term for respective ones of the channelization codes and fitting the impairment correlation terms to a measured impairment correlation; and
   reducing at least one of interference and noise power from the channelization code power estimates at the wireless receiver.

2. The method of claim 1, comprising:
   determining a noise power estimate;
   determining impairment correlation terms for the noise power estimate and respective ones of the channelization codes; and
   fitting the impairment correlation terms to a measured impairment correlation.

3. The method of claim 1, comprising:
   measuring code power levels for respective ones of the channelization codes based on one of despread symbol values or RAKE combined symbol values; and
   converting the code power levels to code power estimates.

4. The method of claim 3, wherein reducing at least one of interference and noise power from the channelization code power estimates comprises removing a noise bias term from the code power estimates, the noise bias term including a noise power estimate.

5. The method of claim 3, wherein reducing at least one of interference and noise power from the channelization code power estimates comprises removing an interference bias term from the code power estimates, the interference bias term including at least one signal power estimate.

6. The method of claim 3, wherein reducing at least one of interference and noise power from the channelization code power estimates comprises removing an interference bias term from the code power estimates, the interference bias term including a sum of initial code power estimates derived from the RAKE combined symbol values.

7. The method of claim 6, wherein removing an interference bias term from the code power estimates comprises:
   reducing noise power from the channelization code power estimates to form initial code power estimates; and
   computing refined code power estimates based on the initial code power estimates.

8. The method of claim 1, comprising:
   determining a noise power estimate and at least one transmitter power estimate;
   estimating code power for respective ones of the channelization codes based on one of despread symbol values or RAKE combined symbol values; and
   using the noise power estimate, the at least one transmitter power estimate and the code powers to estimate an impairment correlation.

9. The method of claim 1, comprising:
   determining an impairment correlation term for respective ones of the channelization codes; and
   fitting the impairment correlation terms to despread symbol value correlations.

10. The method of claim 9, wherein fitting the impairment correlation terms to despread symbol value correlations comprises fitting the impairment correlation terms to a despread pilot symbol value and despread data symbol value correlations.

11. The method of claim 1, comprising:
   estimating a channelization code power for each of one or more channelization codes in a first set; and
   estimating a composite code power for channelization codes in a second set.

12. The method of claim 11, wherein estimating a channelization code power for each of one or more channelization codes in a first set comprises fitting a noise correlation term, at least one composite impairment correlation term and impairment correlation terms corresponding to the channelization codes in the first set to a measured impairment correlation.

13. The method of claim 12, further comprising jointly fitting the noise correlation term, the at least one composite impairment correlation term and the impairment correlation terms corresponding to the channelization codes in the first set to the measured impairment correlation.

14. The method of claim 12, wherein fitting a noise correlation term, at least one composite impairment correlation term and impairment correlation terms corresponding to the channelization codes in the first set to a measured impairment correlation comprises:
   computing the noise correlation term;
   estimating the at least one composite impairment correlation term; and
   subsequently fitting the noise correlation term, the at least one composite impairment correlation term and the impairment correlation terms corresponding to the channelization codes in the first set to the measured impairment correlation.

15. The method of claim 1, comprising estimating channelization code powers for one or more channelization codes associated with an interfering base station.

16. The method of claim 1, further comprising:
   estimating impairment correlation based on channel response estimates and the channelization code power estimates; and
   determining combining weights based on the impairment correlation.

17. The method of claim 1, further comprising determining a power control command based on at least one of the code power estimates.

18. The method of claim 1, further comprising determining a data rate based on at least one of the code power estimates.

19. A wireless communication device comprising:
   circuitry configured to receive a composite signal having contributions from a signal of interest and one or more interfering signals; and
   a baseband processor configured to:
      estimate channelization code powers for a channelization code associated with the signal of interest and one or more channelization codes associated with the one or more interfering signals by determining an impairment correlation term for respective ones of the channelization codes and fitting the impairment correlation terms to a measured impairment correlation; and
      reduce at least one of interference and noise power from the channelization code power estimates.

20. The wireless communication device of claim 19, wherein the baseband processor is configured to estimate channelization code powers for a channelization code associated with the signal of interest and one or more channelization codes associated with the one or more interfering signals by determining a noise power estimate, determining impairment correlation terms for the noise power estimate and respective ones of the channelization codes, and fitting the impairment correlation terms to a measured impairment correlation.

21. The wireless communication device of claim 19, wherein the baseband processor is configured to estimate channelization code powers for a channelization code associated with the signal of interest and one or more channelization codes associated with the one or more interfering signals by measuring code power levels for respective ones of the channelization codes based on one of despread symbol values or RAKE combined symbol values and converting the code power levels to code power estimates.

22. The wireless communication device of claim 21, wherein the baseband processor is configured to reduce at least one of interference and noise power from the channelization code power estimates by removing a noise bias term from the code power estimates, the noise bias term including a noise power estimate.

23. The wireless communication device of claim 21, wherein the baseband processor is configured to reduce at least one of interference and noise power from the channelization code power estimates by removing an interference bias term from the code power estimates, the interference bias term including at least one signal power estimate.

24. The wireless communication device of claim 21, wherein the baseband processor is configured to reduce at least one of interference and noise power from the channelization code power estimates by removing an interference bias term from the code power estimates, the interference bias term including a sum of initial code power estimates derived from the RAKE combined symbol values.

25. The wireless communication device of claim 24, wherein the baseband processor is configured to remove an interference bias term from the code power estimates by reducing noise power from the channelization code power estimates to form initial code power estimates and computing refined code power estimates based on the initial code power estimates.

26. The wireless communication device of claim 19, wherein the baseband processor is configured to estimate channelization code powers for a channelization code associated with the signal of interest and one or more channelization codes associated with the one or more interfering signals by determining a noise power estimate and at least one transmitter power estimate, estimating code power for respective ones of the channelization codes based on one of despread symbol values or RAKE combined symbol values, and using the noise power estimate, the at least one transmitter power estimate and the code powers to estimate an impairment correlation.

27. The wireless communication device of claim 19, wherein the baseband processor is configured to estimate channelization code powers for a channelization code associated with the signal of interest and one or more channelization codes associated with the one or more interfering signals by determining an impairment correlation term for respective ones of the channelization codes and fitting the impairment correlation terms to despread symbol value correlations.

28. The wireless communication device of claim 27, wherein the baseband processor is configured to fit the impairment correlation terms to despread symbol value correlations by fitting the impairment correlation terms to a despread pilot symbol value and despread data symbol value correlations.

29. The wireless communication device of claim 19, wherein the baseband processor is configured to estimate channelization code powers for a channelization code associated with the signal of interest and one or more channelization codes associated with the one or more interfering signals by estimating a channelization code power for each of one or more channelization codes in a first set and estimating a composite code power for channelization codes in a second set.

30. The wireless communication device of claim 29, wherein the baseband processor is configured to estimate a channelization code power for each of one or more channelization codes in a first set by fitting a noise correlation term, at least one composite impairment correlation term and impairment correlation terms corresponding to the channelization codes in the first set to a measured impairment correlation.

31. The wireless communication device of claim 30, wherein the baseband processor is further configured to jointly fit the noise correlation term, the at least one composite impairment correlation term and the impairment correlation terms corresponding to the channelization codes in the first set to the measured impairment correlation.

32. The wireless communication device of claim 30, wherein the baseband processor is configured to fit a noise correlation term, at least one composite impairment correlation term and impairment correlation terms corresponding to the channelization codes in the first set to a measured impairment correlation by computing the noise correlation term, estimating the at least one composite impairment correlation term and subsequently fitting the noise correlation term, the at least one composite impairment correlation term and the impairment correlation terms corresponding to the channelization codes in the first set to the measured impairment correlation.

33. The wireless communication device of claim 19, wherein the baseband processor is configured to estimate channelization code powers for a channelization code associated with the signal of interest and one or more channelization codes associated with the one or more interfering signals by estimating channelization code powers for one or more channelization codes associated with an interfering base station.

34. The wireless communication device of claim 19, wherein the baseband processor is further configured to estimate impairment correlation based on channel response estimates and the channelization code power estimates and determine combining weights based on the impairment correlation.

35. The wireless communication device of claim 19, wherein the baseband processor is further configured to determine a power control command based on at least one of the code power estimates.

36. The wireless communication device of claim 19, wherein the baseband processor is further configured to determine a data rate based on at least one of the code power estimates.

* * * * *

UNITED STATES PATENT AND TRADEMARK OFFICE
CERTIFICATE OF CORRECTION

PATENT NO. : 7,751,463 B2
APPLICATION NO. : 11/566756
DATED : July 6, 2010
INVENTOR(S) : Bottomley et al.

It is certified that error appears in the above-identified patent and that said Letters Patent is hereby corrected as shown below:

On the Title Pg, on Page 2, Item (56), under "OTHER PUBLICATIONS", Line 8, delete "COmmunications," and insert -- Communications, --, therefor.

In Column 3, Line 26, delete "$r_\alpha(t)$" and insert -- $r_a(t)$ --, therefor.

In Column 4, Line 10, delete "M-Rake" and insert -- M-RAKE --, therefor.

In Column 7, Line 46, delete "estimate a" and insert -- estimate α --, therefor.

In Column 7, Line 50, delete "Rake" and insert -- RAKE --, therefor.

In Column 8, Line 17, delete "G-Rake" and insert -- G-RAKE --, therefor.

In Column 8, Line 47, delete "Rake" and insert -- RAKE --, therefor.

In Column 8, Line 55, in Equation (15), delete " $\theta_{i,k} = F_i P_{i,k} - F_i \beta g_i^H R_n g_i = F_i(P_{i,k} - \beta g_i^H R_n g_i)$ " and insert -- $\theta_{i,k} = F_i P_{i,k} - F_i \beta \mathbf{g}_i^H \mathbf{R}_n \mathbf{g}_i = F_i\left(P_{i,k} - \beta \mathbf{g}_i^H \mathbf{R}_n \mathbf{g}_i\right)$ --, therefor.

In Column 9, Line 50, in Equation (21), after "$Q_{i,k}$", insert -- where --.

In Column 9, Line 51, in Equation (22), after "$\theta_{mj}$" delete "where".

Signed and Sealed this

Nineteenth Day of October, 2010

David J. Kappos
*Director of the United States Patent and Trademark Office*

CERTIFICATE OF CORRECTION (continued)
U.S. Pat. No. 7,751,463 B2

In Column 11, Lines 5-6, in Equation (31), delete " $SINR = h'_{i(m),k(m),m}{}^{H} R'^{-1}((m)) h'_{i(m),k(m),m} = w'_m{}^H h'_{i(m),k(m),m}$ " and insert -- $SINR = \mathbf{h}^{H}_{i(m),k(m),m} \mathbf{R}^{-1}(m) \mathbf{h}'_{i(m),k(m),m} = \mathbf{w}^{H}_{m} \mathbf{h}'_{i(m),k(m),m}$ --, therefor.

In Column 11, Line 11, delete "M-Rake" and insert -- M-RAKE --, therefor.

In Column 11, Line 51, in Equation (32), delete " $\hat{R} = \hat{\theta}_1 R_1 + \alpha R_I + \beta R_N \gamma R_O + \hat{\theta}_2 R_2$ "

and insert -- $\hat{\mathbf{R}} = \hat{\theta}_1 \mathbf{R}_1 + \alpha \mathbf{R}_I + \beta \mathbf{R}_N + \gamma \mathbf{R}_O + \hat{\theta}_2 \mathbf{R}_2$ --, therefor.

In Column 12, Line 27, in Equation (34), delete " $\hat{R} = \alpha R_I + \beta R_N + \gamma R_O$ " and insert -- $\hat{\mathbf{R}} = \alpha \mathbf{R}_I + \beta \mathbf{R}_N + \gamma \mathbf{R}_O$ --, therefor.

In Column 13, line 10, in Equation (39), delete " $\hat{R} = \hat{\theta}_1 R_1 + (\alpha - \hat{\theta}_1) R_I + \beta R_N + (\gamma - \hat{\theta}_2) R_O + \hat{\theta}_2 R_2 + \hat{\theta}_0 R_0$ " and insert -- $\hat{\mathbf{R}} = \hat{\theta}_1 \mathbf{R}_1 + (\alpha - \hat{\theta}_1) \mathbf{R}_I + \beta \mathbf{R}_N + (\gamma - \hat{\theta}_2) \mathbf{R}_O + \hat{\theta}_2 \mathbf{R}_2 + \hat{\theta}_0 \mathbf{R}_0$ --, therefor.